INVENTOR.
NORMAN D. MACRAE
BY
Wheeler, Wheeler & Wheeler
ATTORNEYS

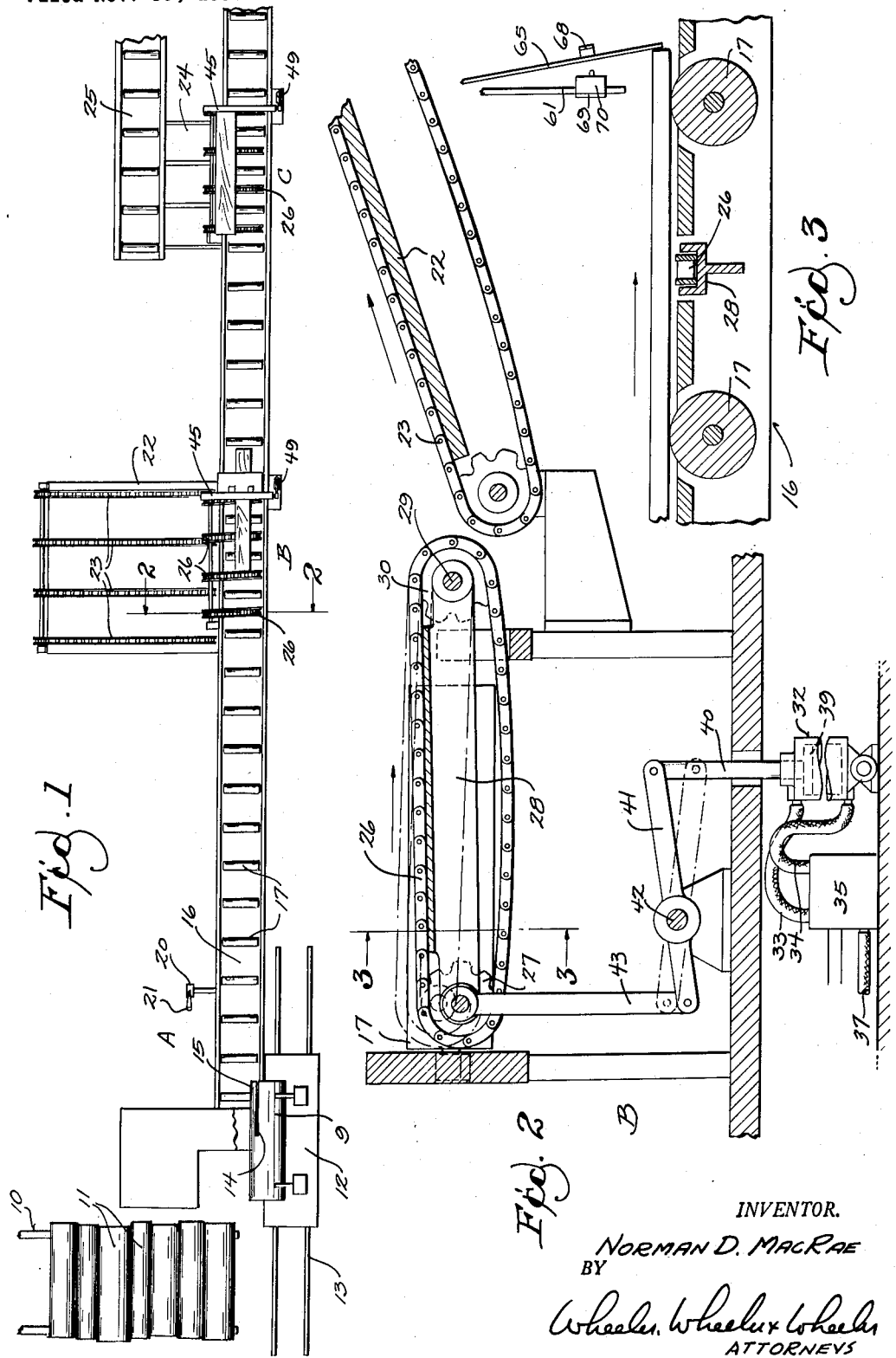

Feb. 14, 1956   N. D. MacRAE   2,734,643
LUMBER HANDLING DEVICE FOR SAW MILLS
Filed Nov. 30, 1951   3 Sheets-Sheet 3
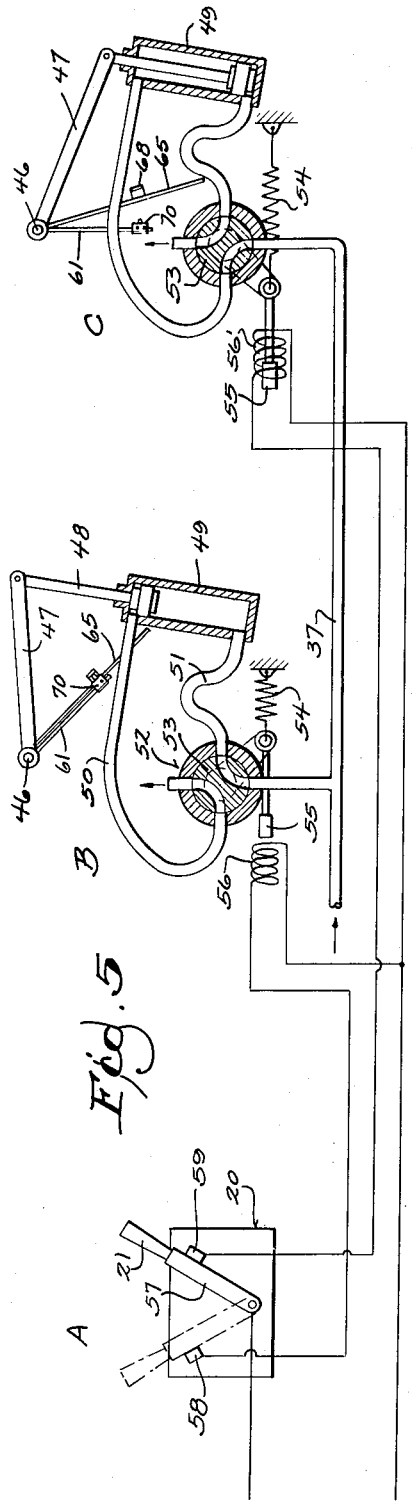
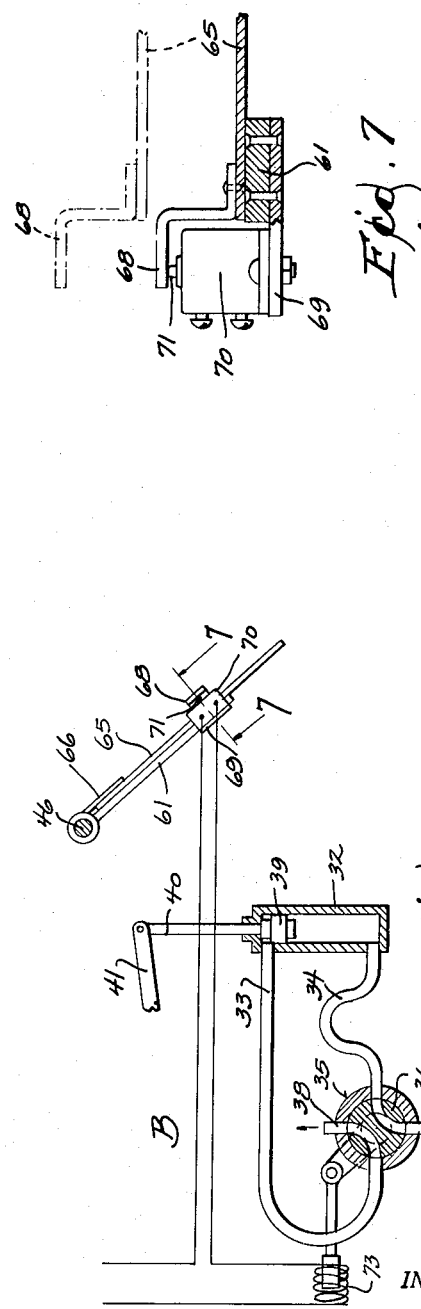
INVENTOR.
NORMAN D. MacRAE
BY
Wheeler, Wheeler & Wheeler
ATTORNEYS

United States Patent Office 2,734,643
Patented Feb. 14, 1956

2,734,643

LUMBER HANDLING DEVICE FOR SAW MILLS

Norman D. MacRae, Laona, Wis., assignor to The Connor Lumber and Land Company, Laona, Wis., a corporation of Wisconsin Application November 30, 1951, Serial No. 259,222

3 Claims. (Cl. 214—11)

This invention relates to a lumber handling device for saw mills.

It is the object of the invention to enable the tail sawyer to pre-set switches to determine which of several courses will ultimately be followed by a board or slab when it reaches selected points in a conveyor system, the actual delivery of the board or slab from the conveyor system being, however, necessarily controlled by the board or slab itself upon arriving at the delivery point. Delivery is effected by cross conveyors which are normally retracted below the level of log movement on the conveyor system and which are necessarily so retracted in order to permit of normal movement of the boards and slabs. Even a board or slab which is to be rejected must move over the retracted cross conveyors before reaching a point from which it can be effectively ejected by the cross conveyors. By his remote control, the tail sawyer sets in the path of a board or slab which is to be ejected a frame and a hinged bumper plate. The frame, hinged co-axially with the bumper plate may be used to elevate the bumper plate out of the way when a board or slab is to go by. When the frame is lowered, the bumper plate comes with it to hold inoperative a switch which controls the functioning of the cross conveyor. When the board or slab to be ejected strikes the bumper plate, the resulting movement of the switch elevates the cross conveyor into engagement with the board or slab to eject it from the main conveyor system. Obviously, any number of such stations may be provided as, for example, a station for the ejection of a piece of lumber to be re-sawed, a station for the ejection of a piece of lumber to be edged, and a station for the ejection of certain slabs.

In the drawings:

Fig. 1 is a diagrammatic plan view of a conveyor system embodying the invention.

Fig. 2 is an enlarged detail view taken in section on line 2—2 of Fig. 1.

Fig. 3 is a view taken in section on line 3—3 of Fig. 2.

Fig. 5 is a diagrammatic view of the control system.

Fig. 6 is a diagrammatic view of the control means for an ejecting conveyor.

Fig. 7 is a view taken in cross section on the line 7—7 of Fig. 6.

Figure 4:
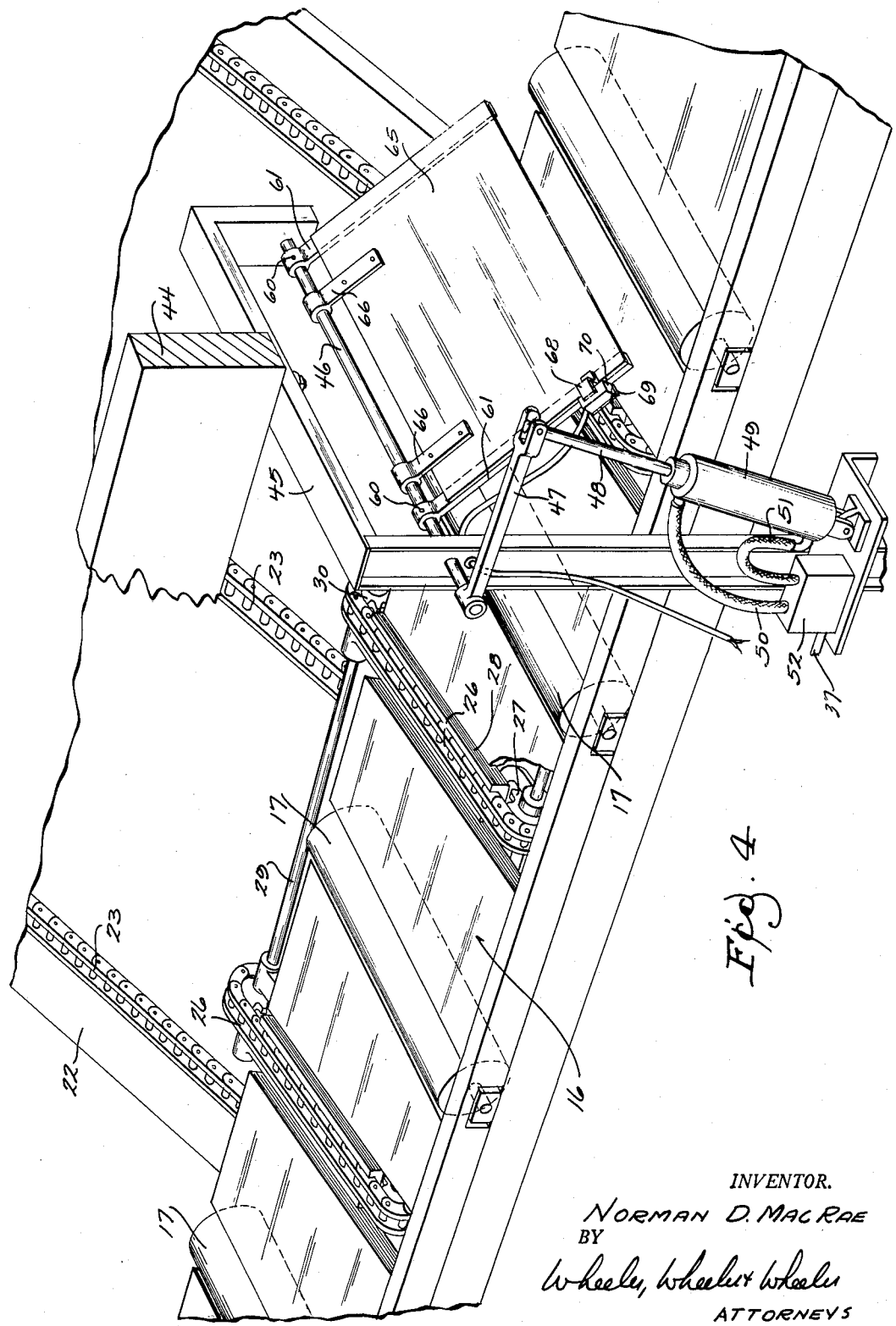
Fig. 4 is a view in perspective of a given station where lateral ejecting conveyors are operable in accordance with the invention.

In the diagrammatic showing of Fig. 1, there is illustrated at 10 a skidway on which the logs 11 are delivered to the saw carriage 12. The saw carriage is reciprocable under the control of its operator along track 13 past a band saw 14 which is illustrated in a position in which it has partially severed slab 15 from the log 9 on the carriage.

The tail sawyer, who stands in the general position indicated at A, receives the slab or board severed by the band saw 14 and sees that it is properly started for movement along the conveyor 16, the rolls 17 of which are power driven. Within the reach of the tail sawyer at station A is a multiple position switch 20, the handle of which is shown at 21.

At station B there is a table 22 across which operate the conveyor chains 23 for delivering selected boards for re-sawing. The re-sawing station is not indicated, having no direct relationship to the present invention. At C there is a table 24 onto which boards may be laterally ejected to be placed on the edging conveyor 25. The edging apparatus is not illustrated, having no direct bearing on the invention. Beyond station C, the live roller bed continues for disposition of slabs. The ejection mechanism at stations B and C is substantially identical and therefore a detailed description of the mechanism at station B will suffice.

As will be observed in Figs. 1 and 2, there are ejecting conveyor chains 26 sufficient in number and spacing to handle any piece of lumber which is to be ejected onto the table 22. The sprockets 27, over which the ends of these chains are guided at the outside of the live roller bed 16, are mounted on links 28 pivoted at or near the shaft 29 which carries the driving sprockets 30. The links 28 and sprockets 27 are normally maintained in the retracted position illustrated in Fig. 2, wherein the upper run of conveyor chain 26 is below the level of the live rolls 17. If the links 28 are simultaneously raised to elevate the several chains 26 above the level of the live rolls 17, a piece of lumber supported on the live rolls will be lifted free of contact with such rolls and propelled by the cross chains 26 for ejection from the live roller bed onto the chains 23 which will take the lumber to the re-saw table. The described movement of the links 28 is conveniently effected pneumatically by the provision of a pneumatic cylinder 32, having air connections 33 and 34 controlled by an electromagnetic valve at 35, as shown in Fig. 6. According to the rotated position of the valve plug 36, air from the line 37 may be admitted to one end or the other of the cylinder 32, the alternate line exhausting through port 38. The piston 39 is connected by rod 40 with the rocker arm 41 of the rock shaft 42 which has connection by links 43 with the conveyor chain mounting links 28 for raising and lowering these in the manner above described.

Carried in part by the live roller bed 16 and in part by the overhead beam 44, is a scaffold 45, open at the rear of the live roller bed, and supporting a rock shaft at 46 controlled in the manner diagrammatically illustrated in Fig. 5 and mechanically shown in Fig. 4. An arm 47 connects to the plunger 48 of an air cylinder 49 having air connections at 50 and 51 to its opposite ends, these being subject to control by an electromagnetically operated valve at 52. The valve plug 53 is biased in one direction by a spring 54 and is connected with armature 55 to be actuated in the opposite direction with the coil 56 which is energized by appropriate movement of the handle 21 of switch 20, controlled by the tail sawyer. When the switch blade 57 engages contact 58, the coil 56 at station B is energized and when the knife blade 57 engages contact 59 of switch 20, the corresponding coil 56' at station C is energized. In an intermediate position of the switch blade 57 neither coil is energized, in which case the respective springs move the respective valve plugs to the position in which plug 53 is shown at station B in Fig. 5. Air from the line 37 is now admitted to the lower ends of the respective cylinders to raise the pistons and thereby to oscillate the rock shaft 46 counterclockwise, as viewed both in Fig. 4 and in Fig. 5.

Fixed to the rock shaft by the pins 60 are arms 61 against which the bumper plate 65 normally rests. With the rock shaft 46 in its normal position, as shown in Fig. 4, these arms will lift the bumper plate 65 on its pivotal connection with shaft 46 out of the paths of the boards or slabs traversing the live roller bed. The bumper plate will be understood to have no rigid connection with shaft 46, but is pivotally suspended therefrom for independent movement with respect thereto, by the straps 66. When the tail sawyer moves the handle 21 to oscillate the switch blade 57 into engagement with one or the other of the contacts 58 or 59, the resulting energization of one or the other of the coils 56 or 56' will oscillate the valve plug 53 at station B or station C to cause the clockwise oscillation of rock shaft 46 at that station and the consequent lowering of the arms 61 and bumper plate 65 into the path of a board or slab traversing the live roller bed of the main conveyor.

The bumper plate 65 and one of the arms 61 have mutually spaced brackets at 68 and 69 between which there is located a switch 70 having a contact actuator at 71. As shown in Fig. 7, the switch may be mounted on bracket 69 with its contact actuator 71 normally engaged by bracket arm 68. Thus, as long as the normal relationship between the bumper plate 65 and the arms 61 is maintained, the contact actuator 71 of switch 70 willl remain depressed and the switch will be held open.

However, at the station at which the arms 61 have been oscillated to lower the bumper plate 65 into the path of a piece of lumber traversing the live rolls, it will be evident that when the end of the piece of lumber strikes the bumper plate, the resulting oscillation of the bumper plate, however slight, will move arm 68 to release actuator 71, thereby permitting the closing of switch 70 as is diagrammatically illustrated at station C in Fig. 5. As indicated at Fig. 6, the switch 70 is in series with the solenoid coil 73 which controls the plug 36 of valve 35 so that the engagement of a piece of lumber with the bumper plate 65 immediately raises the continually operating cross conveyer chains 26 into engagement with the lumber which has struck the bumper plate, thereby ejecting such lumber laterally from the main conveyor system.

By this arrangement, the tail sawyer not only receives the pieces cut from the log and positions them on the main conveyor, but automatically sets in advance the mechanism which will control the ultimate position of the piece just cut. After pre-setting such mechanism by manipulation of the switch handle 21, the tail sawyer can devote his entire attention to his regular duties and the control of the lumber will automatically be governed in due course according to the position of the switch handle. The arrangement not only eliminates the attendance previously required at the various ejector stations but further places the control all within the judgment of one person. Moreover, inasmuch as the ejection is automatically accomplished when the lumber reaches the selected station, no continued attention on the part of the tail sawyer is required.

If the lumber needs re-sawing, it will be automatically ejected at station B upon reaching such station. The bumper plate not only arrests the forward movement of the piece of lumber but initiates its lateral ejection. If the piece of lumber only needs edging, it will be ejected at station C in the same manner. If it is a slab, it will continue past both of these stations. Obviously, as many stations as are required can be controlled in like manner by providing additional contacts for switch 20.

I claim:

1. In a device of the character described, the combination with a rock shaft having laterally spaced arms fixed thereto, of a bumper plate pivoted adjacent the rock shaft for movement independently thereof and biased toward said arms, the rock shaft being oscillatable to enable said arms to lift said plate, bracket means connected respectively with said plate and one of said arms, a switch having self-closing contacts carried by one of said bracket means, said switch having a contact actuator for opening said contacts and disposed in a position to be normally engaged by the other of said brackets.

2. The device of claim 1 in further combination with a remote switch and means controlled by the remote switch for oscillating said rock shaft for the movement of said plate between operative and retracted positions, the plate hanging almost vertical in its operative position, a first conveyor extending beneath the plate to be blocked by said plate in the operative plate position, a second conveyor disposed transversely with respect to the first conveyor and having means for rendering it operative and inoperative and controlled by said first mentioned switch, whereby said second conveyor is rendered operative upon engagement with said plate of a workpiece carried by said first conveyor, said second conveyor remaining inoperative when said arms are oscillated to move said plate to its retracted position free of workpieces traversing the first conveyor.

3. In a lumber handling apparatus which includes a saw for cutting lumber from a saw log and a first conveyor for carrying away the cut lumber deposited thereon by a tail sawyer, the combination with said first conveyor of a cross conveyor normally in a plane slightly below and at an angle to the path of said first conveyor, a switch accessible to the tail sawyer, a rock shaft spanning the first conveyor, said switch controlling means for oscillating the rock shaft, an arm connected with the rock shaft for movement therewith between a raised position and a depending position upon oscillation of the rock shaft, a bumper plate disposed transversely of the first conveyor and pivoted adjacent its upper end substantially coaxially with said rock shaft for movement with said arm upon movement of said arm between a raised and depending position, and for movement independently of said arm when the arm is in depending position to intercept lumber traversing said first conveyor and to be oscillated by such lumber free of said arm, a switch having an actuator, said arm and plate having means adapted to engage the switch and the actuator to hold the switch open in the normal position of the bumper plate and to close said switch when the bumper plate is displaced by lumber traversing the first conveyor, said switch having electrical connections and means controlled thereby for lifting the cross conveyor to engage lumber on the first conveyor whereby to render said cross conveyor operative upon such lumber by raising the plane of movement of said conveyor when the switch is closed, the tail sawyer being able, by manipulation of the switch first mentioned, to oscillate said rock shaft and thereby predispose said cross conveyor for ejection of a piece of lumber traversing the conveyor first mentioned whenever such lumber reaches the bumper plate and displaces it to close such switch.

References Cited in the file of this patent

UNITED STATES PATENTS

| Number | Name | Date |
|---|---|---|
| 711,947 | Dittbenner | Oct. 28, 1902 |
| 771,089 | Prescott | Sept. 27, 1904 |
| 996,386 | Williams | June 27, 1911 |
| 1,868,894 | Glahn | July 26, 1932 |
| 2,362,079 | McCann et al. | Nov. 7, 1944 |
| 2,497,874 | Evans et al. | Feb. 21, 1950 |